UNITED STATES PATENT OFFICE.

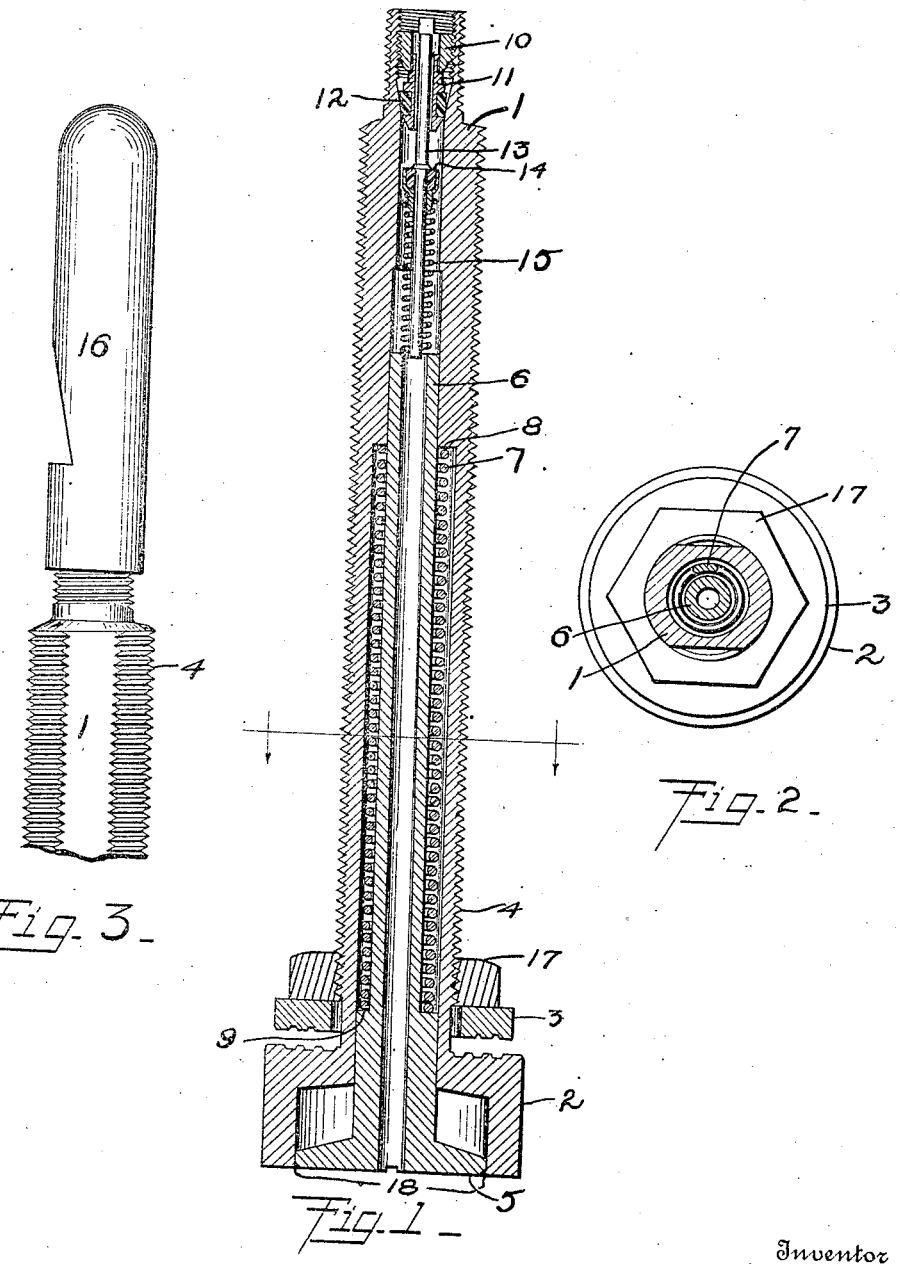

ELMER E. NORGAARD, OF COUNCIL BLUFFS, IOWA.

SIGNAL-VALVE MECHANISM.

1,096,262.	Specification of Letters Patent.	Patented May 12, 1914.

Application filed September 16, 1913. Serial No. 789,988.

*To all whom it may concern:*

Be it known that I, ELMER E. NORGAARD, a citizen of the United States, residing at Council Bluffs, in the county of Pottawattamie, in the State of Iowa, have invented certain new and useful Improvements in Signal-Valve Mechanism, and have described the same in the following specification, illustrated by the accompanying drawings.

My invention relates to that class of valve mechanisms which comprise automatic pressure valves and are available for charging pneumatic tires and other receptacles with compressed air, or with other elastic fluids under pressure.

By such mechanism applied to an automobile tire it is the main object of the invention to produce an audible signal whenever the air pressure in the tire falls below the normal and predetermined point by reason of leakage, or puncture: and thereby to enable the driver to avoid running the vehicle upon a flat tire. To accomplish this object I incorporate in a mechanism of the specified class a means for opening the valve when the pressure in the tire is reduced and a pneumatic signal operated by the fluid escaping from the valve when opened.

In these drawings, illustrating the best manner in which I have contemplated applying the principles of the invention, Figure 1 is an axial section of a valve mechanism constructed in accordance with these principles, and shown without the signal. Fig. 2 is a cross section on the section line of Fig. 1. Fig. 3 is a side elevation of the valve signal applied to a contiguous portion of the same valve mechanism.

In this illustrative specimen of my invention the tubular stem 1 has a terminal coaxial cylindrical hollow head, or cup, 2, which opens into the hollow interior of the pneumatic tube, or other receptacle to which the device is to be applied. The wall of such a tube may be clamped between the cup 2 and the nonrotatable washer 3 in the usual manner by means of the nut 17 working on the external threads 4 of the stem. The annular, or centrally perforated, piston 5, having the tubular piston-rod 6 working in the tubular stem 1, occupies the cup 2 and is reciprocable therein. The spiral spring 7, suitably compressed between the shoulder 8 in the stem 1 and the shoulder 9 on the rod 6, continually resists the variable pneumatic pressure which is exerted upon the face of the piston 5; and, whenever the pressure thereon falls below the predetermined number of pounds necessary to be maintained in the tire, this spring impels the piston to the extreme position shown in Fig. 1, where it is stopped in the mouth of the cup by the inbent annular lip 18.

In the free end of the stem 1 is placed valve mechanism of an ordinary type, comprising the axially perforated screw plug 10, the similarly perforated valve seat 11, which is movably attached to the screw plug and is fitted to the stem 1 by the gasket 12, the valve rod 13, which works coaxially both in the plug and in the valve seat, the valve 14 carried by the valve rod, and the spiral spring 15 encircling this rod. This valve and the piston-rod 6 are both separated from each other and connected with each other by this spring.

The screw cap 16, constructed as a whistle, is normally placed on the free end of the stem 1, as shown in Fig. 3, and is temporarily removed therefrom by hand from time to time, whenever the tire is to be filled or recharged with air. After the removal of this cap, the nozzle of a supply pipe is operatively applied to the free end of the stem 1 in the usual manner, and discharges air under pressure through the tubular rod 6 and the piston 5 until the desired pressure is produced in the tire. By forcing the piston 5 to the inner end of the cup 2, this pressure, so long as it is maintained at or above the predetermined minimum, holds the spring 7 in compression. But whenever the tire pressure is reduced below the minimum, this spring drives the piston 5 to its original position shown in Fig. 1, in which position the piston is stopped by contact with the lips 18. In moving to this position, the piston, acting through the piston-rod 6 and the attached spring 15, withdraws the valve 14 from the valve seat 11 and thereby opens a continuous air passage, shown in Fig. 1, from the tire to the whistle positioned as in Fig. 3. Thereupon the whistle is blown by the air escaping from the tire, whenever the tire pressure falls unduly.

I claim as my invention—

1. Valve mechanism of the specified class, comprising a tubular stem adapted at one end to engage the nozzle of a supply pipe and at the other end to communicate with the interior of a pneumatic receptacle, a cylindrical cup formed coaxially upon the inner end of the stem, a centrally perforated piston working in the cup, and having a tubular piston rod working coaxially in the stem, a spiral spring under compression between the stem and the piston, an axially perforated screw plug in the outer end of the stem, a similarly perforated valve seat attached to the screw plug and fitted to the interior of the stem, a valve rod working coaxially in the plug and in the valve seat, a valve carried by the valve rod to and from the valve seat, a spiral spring encircling the valve rod and connecting the valve with the piston rod and a whistle removably capping the first-mentioned end of the stem.

2. Valve mechanism of the specified class, comprising a tubular stem adapted to engage the nozzle of a supply pipe and to communicate with the interior of a pneumatic receptacle, a cup formed coaxially upon the inner end of the stem, a continuously perforated piston and piston rod working in the cup and stem, a spring under compression between the piston and the stem, an axially perforated screw plug in the outer end of the stem, a similarly perforated valve seat fitted to the interior of the stem and attached to the screw plug, a valve rod working coaxially in the valve seat, a valve carried by the valve rod, a yielding connection between the valve and the piston rod, and a whistle removably fitted over the outer end of the stem.

In testimony whereof I subscribe my name hereto in the presence of two witnesses.

ELMER E. NORGAARD.

Witnesses:
 WILLARD EDDY,
 A. M. POWER.